(12) United States Patent
Nozaki et al.

(10) Patent No.: US 8,485,305 B2
(45) Date of Patent: Jul. 16, 2013

(54) ALL TERRAIN VEHICLE WITH POWER STEERING SHIELD

(75) Inventors: Takuma Nozaki, Kobe (JP); Kazumasa Hisada, Akashi (JP); Kiyohisa Yoshikawa, Akashi (JP); Itsuo Takegami, Kobe (JP); Satoshi Masuda, Akashi (JP); Takafumi Kumada, Kobe (JP); Takeshi Tanaka, Kakogawa (JP); Sunao Kaihatsu, Ibo-gun (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 345 days.

(21) Appl. No.: 12/882,043

(22) Filed: Sep. 14, 2010

(65) Prior Publication Data
US 2012/0061166 A1 Mar. 15, 2012

(51) Int. Cl.
*B62D 5/04* (2006.01)
*B62K 5/01* (2013.01)
(52) U.S. Cl.
CPC .............. *B62D 5/0403* (2013.01); *B62K 5/01* (2013.01)
USPC .......... 180/444; 280/848; 180/68.2; 180/68.4

(58) Field of Classification Search
USPC ....... 180/443, 444, 68.2, 68.4, 68.6; 280/847, 280/152.1, 848, 154, 851, 852, 159
See application file for complete search history.

(56) References Cited

U.S. PATENT DOCUMENTS

| | | | | |
|---|---|---|---|---|
| 5,887,671 | A * | 3/1999 | Yuki et al. | 180/68.1 |
| 7,380,622 | B2 * | 6/2008 | Shimizu | 180/68.1 |
| 7,665,566 | B2 * | 2/2010 | Okada et al. | 180/291 |
| 7,837,003 | B2 * | 11/2010 | Tsutsumikoshi et al. | 180/444 |
| 8,074,764 | B2 * | 12/2011 | Tsutsumikoshi et al. | 180/443 |
| 2009/0078491 | A1 * | 3/2009 | Tsutsumikoshi et al. | 180/443 |

* cited by examiner

*Primary Examiner* — Paul N Dickson
*Assistant Examiner* — Wesley Potter
(74) *Attorney, Agent, or Firm* — Alleman Hall McCoy Russell & Tuttle LLP

(57) ABSTRACT

An all terrain vehicle includes a vehicle body frame, a steering shaft rotatably supported by the vehicle body frame, a power steering device including an electric motor, the power steering device being configured to exert an auxiliary rotational force to the steering shaft by a driving power generated in the electric motor, a radiator disposed in front of the electric motor, and a shield member mounted to the vehicle body frame and positioned between the radiator and the electric motor to cover the electric motor from a forward direction.

19 Claims, 11 Drawing Sheets

ALL TERRAIN VEHICLE WITH POWER STEERING SHIELD

BACKGROUND OF THE INVENTION

1. Field of the Invention

The present invention relates to an all terrain vehicle (ATV) including a power steering device.

2. Description of the Related Art

An all terrain vehicle configured to drive off-road includes a radiator for cooling an engine. Typically, the radiator is positioned at the front portion of a vehicle body to easily receive wind from a forward direction. Air blowing against the radiator is heated by heat exchange with a coolant while passing through the radiator, and then the heated air is released from the radiator in a rearward direction. To enable a driver to steer a handle with a smaller force, some all terrain vehicles include a power steering device configured to exert an auxiliary rotational force to a steering shaft which is rotated by a driver's steering operation. The power steering device includes an electric motor for generating the auxiliary rotational force.

As disclosed in U.S. Pat. No. 7,380,622, the electric motor is positioned at the front portion of a vehicle and immediately behind a radiator to change a direction of a front wheel. In this structure, the electric motor directly receives heated air released from the radiator. This may increase a chance that performance of the electric motor degrades and a driver cannot steer a handle comfortably.

SUMMARY OF THE INVENTION

According to the present invention, an all terrain vehicle comprises a vehicle body frame; a steering shaft rotatably supported by the vehicle body frame; a power steering device including an electric motor, the power steering device being configured to exert an auxiliary rotational force to the steering shaft by a driving power generated in the electric motor; a radiator disposed in front of the electric motor; and a shield member mounted to the vehicle body frame and positioned between the radiator and the electric motor to cover the electric motor from a forward direction.

In accordance with such a configuration, the shield member serves to protect the electric motor from the heated air released in a rearward direction from the radiator. Therefore, it is possible to prevent degradation of performance of the electric motor which would make the driver's steering feel uncomfortable.

The above and further objects, features and advantages of the disclosure will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. As used herein, the directions are referenced from a driver mounting an all terrain vehicle, unless otherwise explicitly noted.

Figure 1:
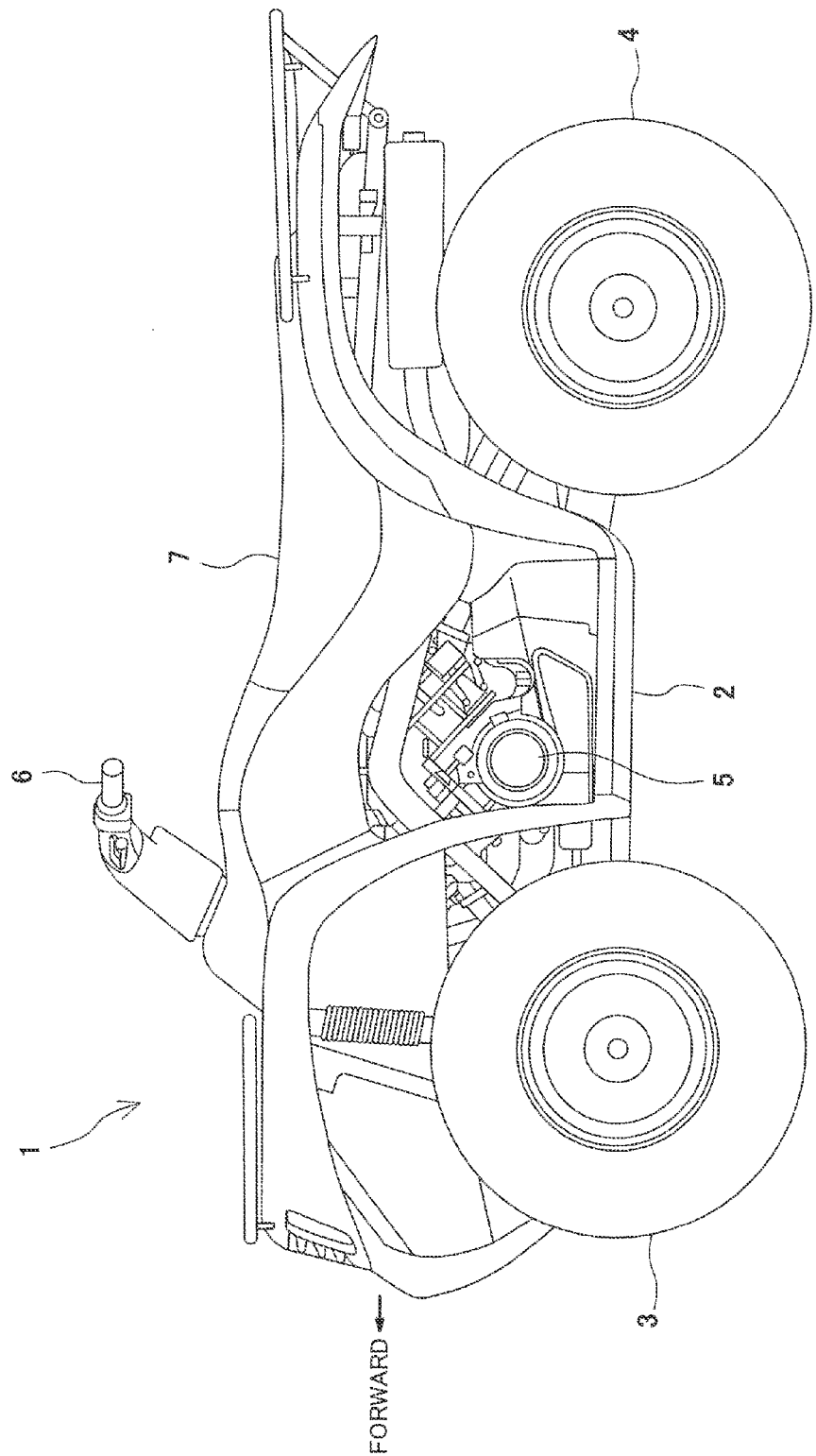
FIG. 1 is a left side view of an all terrain vehicle according to Embodiment 1 of the present invention.

FIG. 1 is a left side view of an all terrain vehicle 1 according to an embodiment of the present invention. Turning to FIG. 1, the all terrain vehicle 1 is a straddle-type four-wheeled vehicle, including a vehicle body frame 2 formed by a weld assembly mainly composed of metal-made pipes, front wheels 3 suspended at the front portion of the vehicle body frame 2, and rear wheels 4 suspended at the rear portion of the vehicle body frame 2. An engine 5 is positioned between the front wheels 3 and the rear wheels 4 and is mounted to the vehicle body frame 2. A bar-type steering handle 6 is provided behind and above the front wheels 3 for the driver to steer the vehicle 1. A seat 7 straddled by the driver is mounted behind the handle 6.

Figure 2:
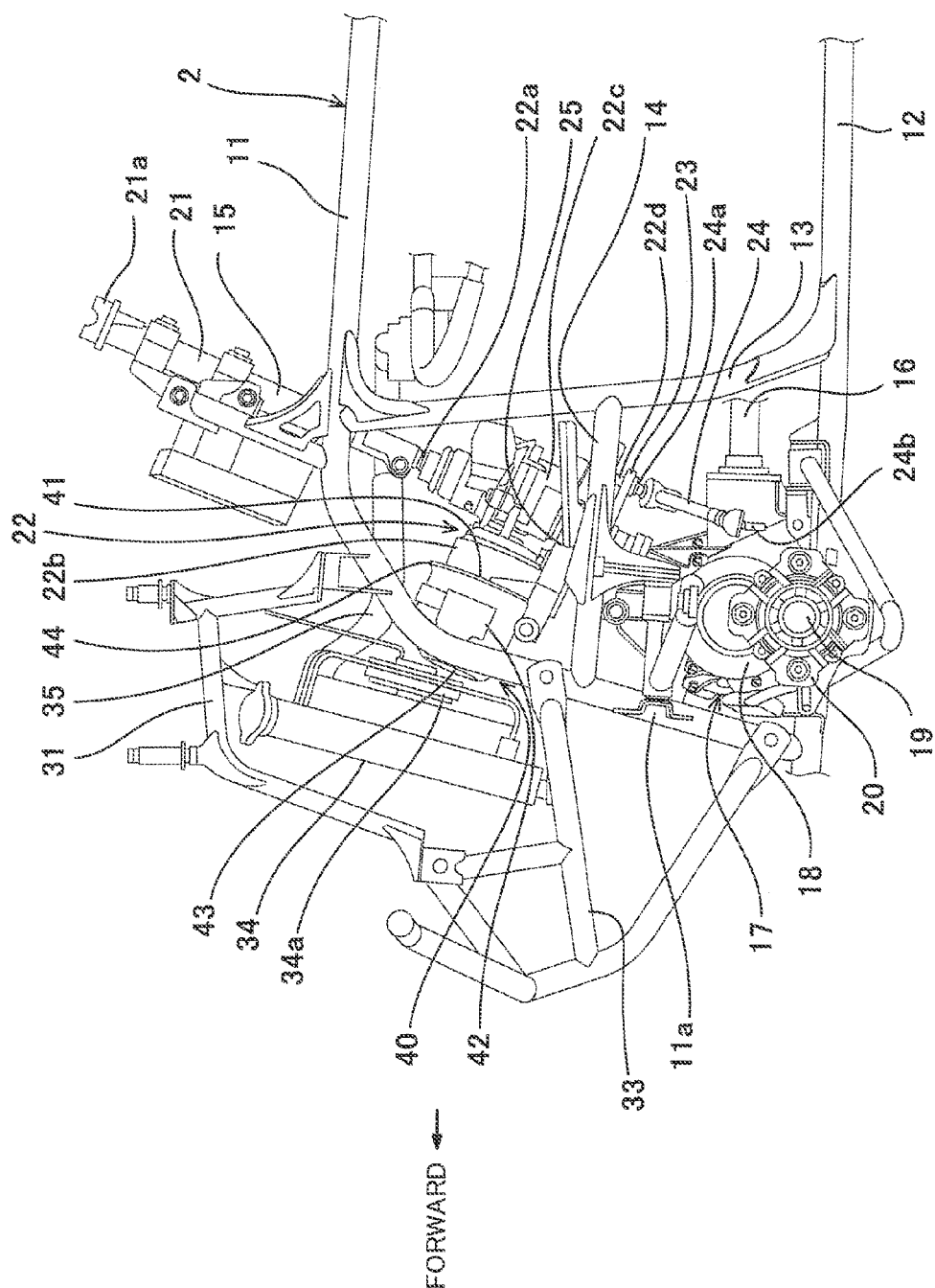
FIG. 2 is a left side view of constituents surrounding a steering shaft of the all terrain vehicle of FIG. 1.
Figure 3:
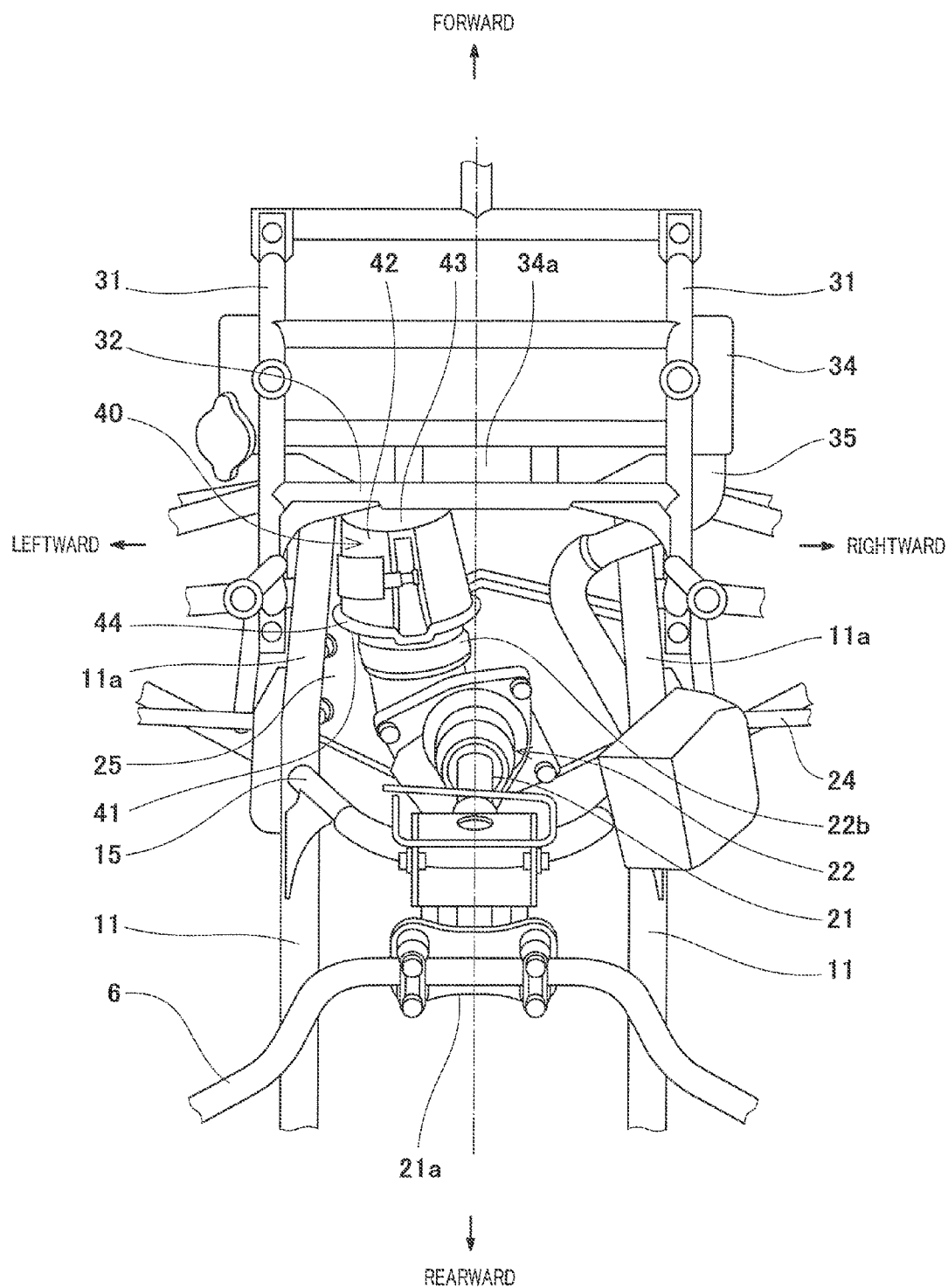
FIG. 3 is a plan view of constituents surrounding the steering shaft of the all terrain vehicle of FIG. 1.

FIG. 2 is a left side view showing constituents surrounding the steering shaft 21 of the all terrain vehicle 1 of FIG. 1. FIG. 3 is a plan view of constituents surrounding the steering shaft 21 of the all terrain vehicle 1 of FIG. 1. As shown in FIG. 2, the vehicle body frame 2 includes a pair of right and left upper main frame members 11 extending in the longitudinal direction of a vehicle body of the vehicle 1, and a pair of right and left lower main frame members 12 extending in the longitudinal direction below the upper main frame members 11. The lower ends of portions 11a (hereinafter referred to as downwardly tilted portions) tilted in a downward direction at the front portions of the upper main frame members 11 are coupled to the lower main frame members 12, respectively. A gusset pipe member 13 vertically extending to be slightly tilted is coupled to the upper main frame member 11 and the corresponding lower main frame member 12. A sub-gusset pipe member 14 extending substantially horizontally is coupled to the front portion of the upper main frame member 11 and to the intermediate portion of the gusset pipe member 13. A steering support frame member 15 protruding upward is coupled to the front portions of the right and left upper main frame members 11 to couple the upper main frame members 11 to each other.

A transaxle device 17 is provided on a center line extending in the longitudinal direction of the vehicle body of the all terrain vehicle 1 as viewed from above in a region between the lower main frame member 12 and the sub-gusset pipe member 14 as viewed from the side. A propeller shaft 16 for transmitting a driving power from the engine 5 (see FIG. 1) is coupled to the transaxle device 17. The transaxle device 17 includes a gear case 18 accommodating a reduction gear and a differential gear, an axle 19 protruding laterally from the gear case 18, and a brake unit 20 which is provided at the tip end of the axle 19 and coupled to the front wheels 3.

A metal-made steering shaft 21 is disposed at the front portion of the vehicle body frame 2. The steering shaft 21 extends vertically through substantially the center region between the right and left upper frame members 11 such that the steering shaft 21 is slightly tilted in a rearward direction. A handle mounting portion 21a is provided at the upper end portion of the steering shaft 21 to mount the bar-type steering handle 6 (see FIGS. 1 and 3). A lower end portion 21b of the steering shaft 21 is coupled to an input shaft 22a of an electric power steering device 22 (hereinafter referred to as EPS device 22). The EPS device 22 is mounted to the vehicle body frame 2 such that the EPS device 22 is fastened to the sub-gusset pipe members 14 via a support board 25. The support board 25 is positioned above the transaxle device 17 and below the power steering device 22.

The EPS device 22 includes the input shaft 22a, a sensor (not shown), an electric motor 22b, a gear box 22c, and an output shaft 22d. The input shaft 22a extends coaxially with the steering shaft 21. The electric motor 22b is oriented in a forward direction substantially perpendicular to the input shaft 22a. The electric motor 22b is positioned to slightly deviate to the left from the center axis extending in the longitudinal direction of the vehicle 1 as viewed from above (see FIG. 3).

The output shaft 22d of the EPS device 22 is attached with a center arm 23 such that the center arm 23 is rotatable integrally with the output shaft 22d. One end portion 24a of a pair of right and left tie rods 24 are rotatably coupled to the center arm 23. Opposite end portions 24b of the tie rods 24 are rotatably coupled to arms (not shown) attached to the front wheels 3 (see FIG. 1).

When the driver steers the handle 6 (see FIG. 1) and the steering shaft 21 rotates, the rotational force of the steering shaft 21 is transmitted to the input shaft 22a of the EPS device 22. In the EPS device 22, a sensor (not shown) detects the rotational force input to the input shaft 22a, and the electric motor 22b is activated based on a detection signal from the sensor, to generate a driving power to exert an auxiliary rotational force to the steering shaft 21. As a result, the steering force for the front wheels 3 is reduced, and the driver can steer the handle 6 (see FIG. 1) with a smaller force. The electric motor 22b generates heat, upon the start of the rotation. The electric motor 22b has a self-protective function to reduce a driving power to lessen a heat generation amount, when its temperature is elevated.

A pair of right and left frame members 31 which are of a substantially inverted-U shape as viewed from the side are coupled to the upper end portions of the downwardly tilted portions 11a of the right and left upper main frame members 11, respectively. The frame members 31 are coupled to each other by a cross frame member 32 (see FIG. 3). A bumper frame member 33 is coupled to each of vertically center portions of the downwardly tilted portions 11a of the upper main frame members 11 and extends forward.

Referring to FIGS. 2 and 3, the radiator 34 is positioned in front of the electric motor 22b of the power steering device 22, at the front portion of the vehicle body frame 2. The radiator 34 has a substantially rectangular shape as viewed from the front. The upper edge portion of the radiator 34 is coupled to the cross frame member 32, while the lower edge portion thereof is coupled to the bumper frame member 33. The radiator 34 includes a radiator fan 34a at a rear portion thereof. The radiator fan 34a is an axial fan. The rotational shaft of the radiator fan 34a extends in the longitudinal direction of the vehicle body.

A shield member 40 is provided at the front portion of the vehicle body frame 2. The shield member 40 is positioned between the radiator 34a and the electric motor 22b to cover the electric motor 22b from a forward direction. The shield member 40 entirely has a substantially cup shape, having a peripheral wall 42 and a bottom wall 43 defining a space 45 (see FIGS. 4, 5, and 9) opened through an opening 41 (see FIG. 5). The front portion of the electric motor 22b is accommodated into the space 45 of the shield member 40 and surrounded by the peripheral wall 42. The bottom wall 43 of the shield member 40 covers the electric motor 22b from the forward direction. The opening 41 of the shield member 40 is open in a rearward direction.

Referring to FIGS. 2 and 3, when the radiator fan 34a is activated, air is taken from the forward direction and cools an engine coolant fed to the radiator 34 through a coolant hose 35. In the radiator 34, the air is heated by heat exchange with the engine coolant, and the heated air is released in a rearward direction from the radiator fan 34a. The heated air collides against the outer surface of the bottom wall 43 of the shield member 40 and then flows in a rearward direction along the outer surface of the peripheral wall 42. In this way, the shield member 40 protects the electric motor 22b from the heated air from the radiator fan 34a. This prevents the electric motor 22b from performing the self-protective function due to the heated air from the radiator fan 34a. As a result, it is possible to prevent that the output of the electric motor 22b decreases due to the heated air and the auxiliary rotational force exerted to the steering shaft 21 decreases. Since the electric motor 22b is accommodated into the substantially-cup shaped shield member 40, the side portions of the electric motor 22b as well as the front end portion thereof are sufficiently protected from the heated air. During driving off-road, the shield member 40 can protect the front portion and side portions of the electric motor 22b from debris, such as muddy water or small stones, colliding against the front wheel 3 and bouncing from the road surface.

The shield member 40 has a flange 44 protruding outward at the rear end portion of the outer surface of the peripheral wall 42. In this structure, the heated air flowing in a rearward direction along the outer surface of the peripheral wall 42 contacts the flange 44, and is guided along the flange 44 to flow away from the outer surface of the peripheral wall 42. Therefore, portions (portions located behind the opening 41) of the side portions of the electric motor 22b which are exposed outside the shield member 40 are effectively protected from the heated air.

The shield member 40 is fastened to the front end portion of the support board 25 for supporting the power steering device 22 by bolts (not shown) and mounted to the vehicle body frame 2 via the support board 25. Since the electric motor 22b and the shield member 40 are mounted to an identical component as described above, a dimension error between the electrode motor 22b and the shield member 40 is small. The power steering device 22 and the shield member 40 may be mounted to the support board 25 to form a sub-assembly, which may then be mounted to the vehicle body frame 2 to assemble the all terrain vehicle 1. In this way, the all terrain vehicle 1 incorporating the shield member 40 can be easily assembled.

Figure 4:
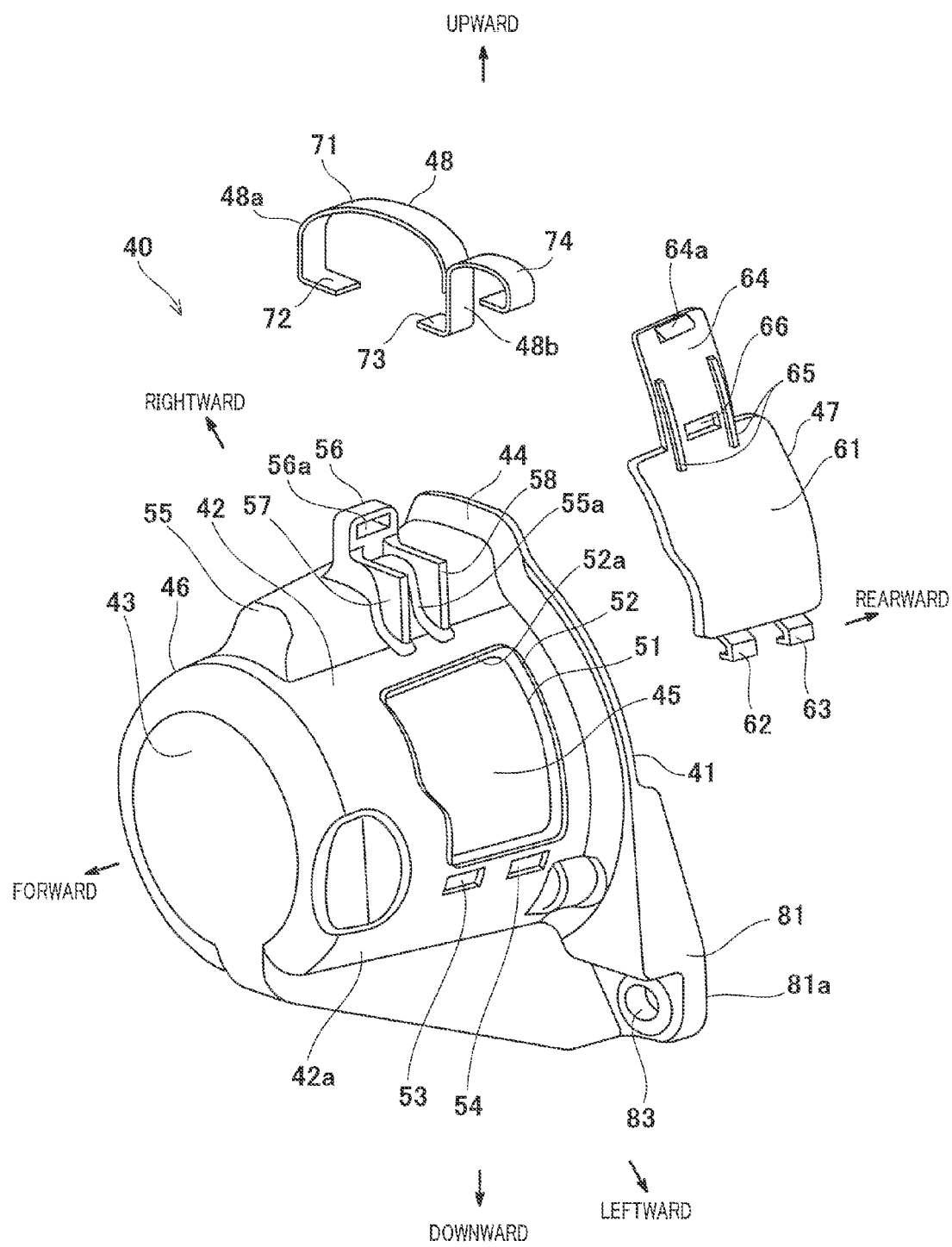
FIG. 4 is an exploded perspective view of a shield member of FIGS. 2 and 3.

FIG. 4 is an exploded perspective view of the shield member 40 of FIGS. 2 and 3. As shown in FIG. 4, the shield member 40 of Embodiment 1 includes a base member 46, a lid member 47 for opening and closing a window 51 of the base member 46, and a clamp member 48 for clamping the base member 46 and the lid member 47 such that the lid member 47 is disengageably engaged with the base member 46.

Figure 5:
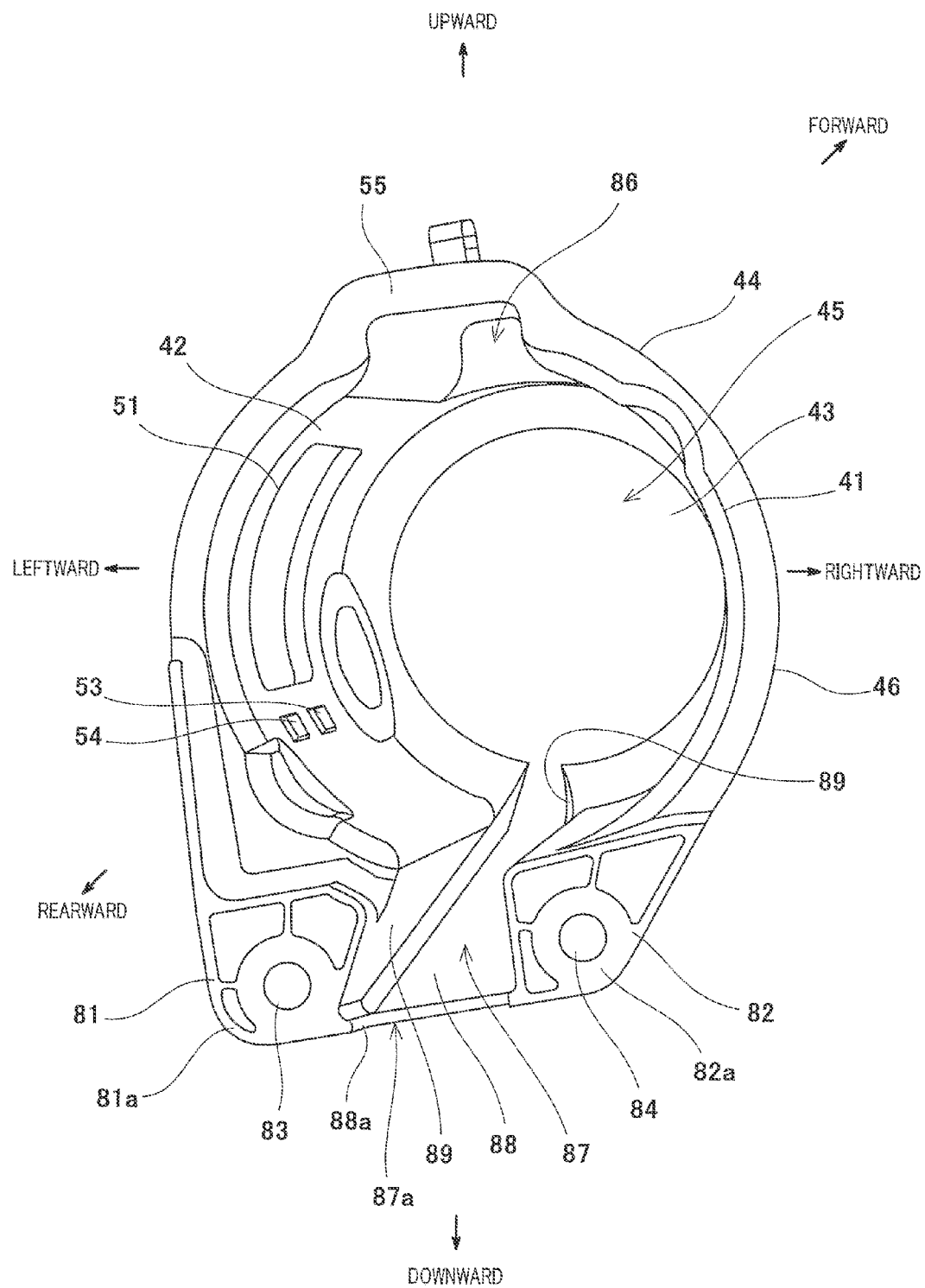
FIG. 5 is a rear view of a base member of FIG. 4.
Figure 6:
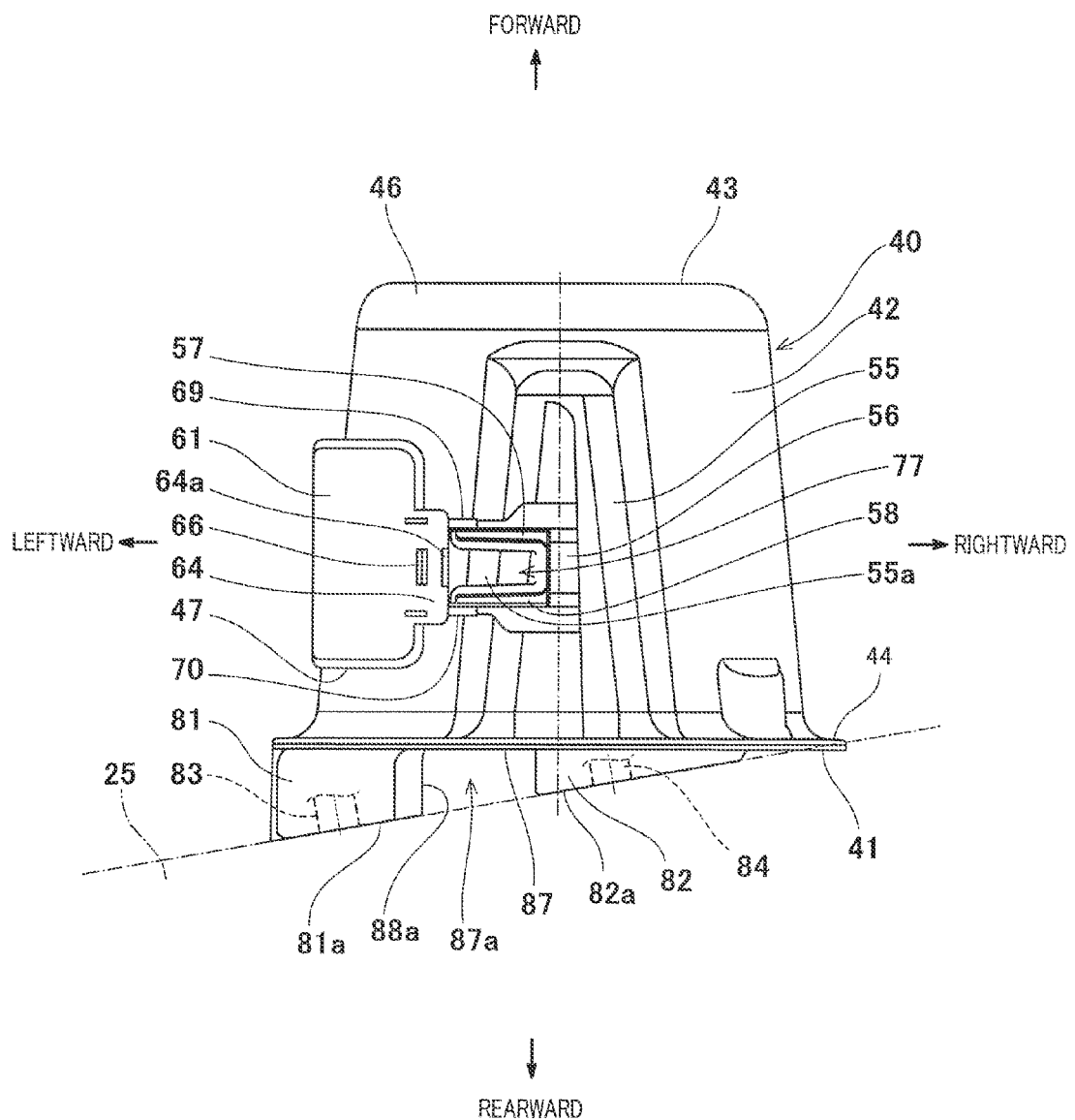
FIG. 6 is a plan view of the base member of FIG. 4 to which a lid member is attached.
Figure 7:
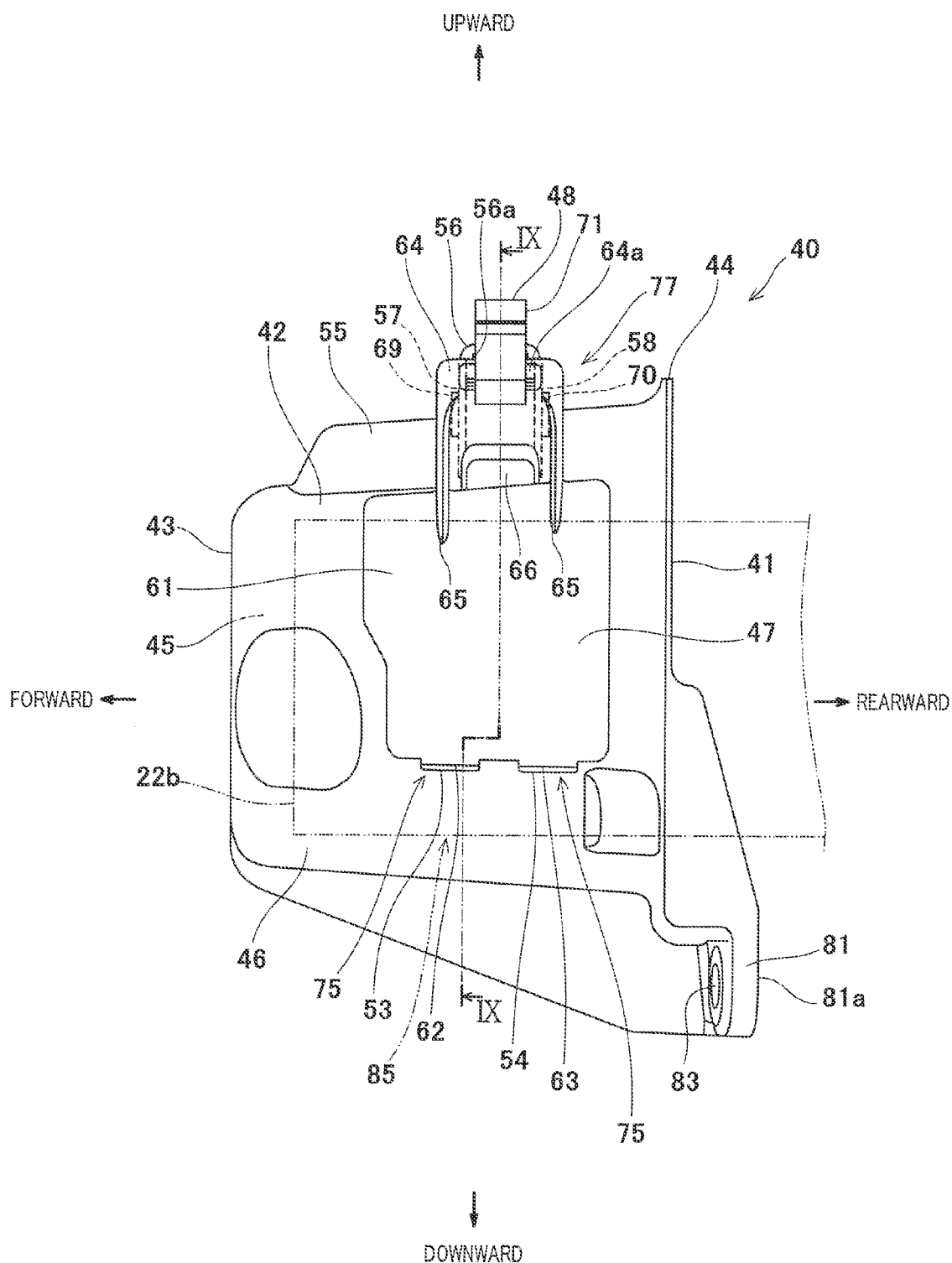
FIG. 7 is a side view of the base member of FIG. 4 to which the lid member and a clamp member are attached.

FIG. 5 is a rear view of the base member 46 of FIG. 4. FIG. 6 is a plan view of the base member 46 of FIG. 4 to which the lid member 47 is attached. FIG. 7 is a side view of the base member 46 of FIG. 4 to which the lid member 47 and the clamp member 48 are attached. With reference to FIGS. 4 to 7, the base member 46 of Embodiment 1 will be described. The base member 46 of FIG. 4 is made of a resin material such as polypropylene containing glass fibers, or other materials and has a structural feature of the shield member 40 as described above. To be specific, the base member 46 has a substantially cup shape, having a peripheral wall 42 and a bottom wall 43 defining the space 45 opened through the opening 41, and a flange 44 protruding outward at the rear end portion of the outer surface of the peripheral wall 42. The rear end portion of the base member 46 is fastened to the front end portion of the support board 25 (see FIG. 6) by bolts.

As shown in FIGS. 5 and 6, the base member 46 has a pair of left and right boss forming portions 81 and 82 protruding in a downward direction from the rear end portion of the peripheral wall 42 forming the opening 41. The boss forming portions 81 and 82 are provided with bosses 83 and 84, respectively, extending substantially in a forward and rearward direction, i.e., substantially in the longitudinal direction of the vehicle body.

As shown in FIG. 6, rear end surfaces 81a and 82a of the boss forming portions 81 and 82 are configured to be in surface contact with the front end portion of the support board 25. Then, bolts are inserted through the bosses 83 and 84 from the forward direction and threaded into threaded portions of the support board 25, thereby allowing the base member 46 to be fastened to the support board 25. A portion of the front end portion of the support board 25, to which the base member 46 is fastened, is tilted rearward in a leftward direction. The rear end surfaces of the boss forming portions 81 and 82 are tilted to conform in shape to the front end portion of the support board 25. In contrast, the normal line of the opening 41, i.e., axis (see one-dotted line in FIG. 6) of the peripheral wall 42 and the space 45 is oriented substantially in the longitudinal direction. To form the tilted rear end surfaces 81a and 82a, the boss forming portions 81 and 82 of this embodiment protrude in a rearward direction more than the opening 41, which easily ensures a large wall thickness of the boss forming portions 81 and 82, a large axial length of the bosses 83 and 84, and a large axial length of bolts inserted through the bosses 83 and 84, respectively.

Referring to FIG. 5, the space 45 of the base member 46 has a substantially circular cross-section increasing in dimension toward the opening 41, i.e., in a rearward direction of the all terrain vehicle 1.

Referring to FIG. 7, in a state where the electric motor 22b is accommodated into the space 45, there is a clearance 85 between the inner surface of the peripheral wall 42 and the outer surface of the electric motor 22b. Since the electric motor 22b has a substantially constant outer diameter in an axial direction (see one-dotted line in FIG. 6), the clearance 85 increases in dimension toward the opening 41. During driving of the all terrain vehicle 1 (see FIG. 1), there is a chance that debris, such as muddy water, may splash into the clearance 85 through the opening 41. The debris is easily discharged through the opening 41, because the clearance 85 gradually increases in dimension toward the opening 41. In addition, heated air released from the electric motor 22b into the clearance 85 is easily discharged through the opening 41.

As shown in FIG. 5, the base member 46 has an upper groove 86 which is formed by protruding the upper portion of the inner surface of the peripheral wall 42 and is connected to the space 45. The upper groove 86 extends in the forward and rearward direction through the entire inside of the space 45 from the front end portion of the peripheral wall 42 to the opening 41 and is opened together with the opening 41 at the rear end portion of the base member 46. This structure allows the heated air released from the electric motor 22b (see FIG. 7) into the clearance 85 (see FIG. 7) to move into the upper groove 86 and be discharged outside through the upper groove 86. The upper groove 86 can easily discharge the heated air in the base member 46.

The base member 46 further has a lower groove 87 which is formed by protruding the lower portion of the inner surface of the peripheral wall 42 in a downward direction and is connected to the space 45. The lower groove 87 extends in the forward and rearward direction through the inside of the space 45 from the inner surface of the bottom wall 43 to the opening 41 and is open together with the opening 41 at the rear end portion of the base member 46. The rear end portion of the lower groove 87 is positioned between the pair of boss forming portions 81 and 82.

The lower groove 87 includes a bottom groove portion 88 extending in the forward and rearward direction below the inner surface of the peripheral wall 42 and a pair of side groove portions 89 connecting the bottom groove portion 88 to the inner surface of the peripheral wall 42. The bottom groove portion 88 is tilted downward in a rearward direction toward the opening 41 together with the lower portion of the inner surface of the peripheral wall 42. Therefore, within the clearance 85 (see FIG. 7), debris such as muddy water, are collected into the lower portion of the inner surface of the peripheral wall 42 by its own weight, and a part of the collected debris moves into the lower groove 87. Debris is guided along the downwardly tilted inner surface of the peripheral wall 42 or the downwardly tilted bottom groove portion 88, to the opening 41 or the rear end portion of the lower groove 87, and is easily discharged outside the space 45.

A rear end portion 88a of the bottom groove portion 88 is cut in a U-shape in a forward direction, thereby forming a cut portion 87a in the lower groove 87. As shown in FIG. 6, the rear end portion of the lower groove 87 is open in a downward direction via the cut portion 87a, in a location between the pair of boss forming portions 81 and 82 and in front of the support board 25. In this structure, debris moving through the lower groove 87 does not reach the upper surface of the support board 25 but drop in a downward direction through the cut portion 87a. This makes it possible to prevent the power steering device 22 (see FIGS. 2 and 3) mounted onto the support board 25 from being contaminated by the debris within the clearance 85.

As shown in FIG. 4, the base member 46 of this embodiment has a window 51 configured to partially open the peripheral wall 42 for an operator to easily carry out a maintenance operation, such as discharging of the debris from the clearance 85. Hereinafter, the window 51 and the associated constituents provided for the maintenance operation will be described with reference to FIGS. 4, 6 to 9.

As shown in FIG. 4, the window 51 partially opens a left portion of the peripheral wall 42. Restricting ribs 52 are provided at the outer surface 42a of the peripheral wall 42 to protrude from the peripheral portion of the window 51, to form a window profile shape surrounding window 51. Two engagement holes 53 and 54 are arranged in the outer surface 42a of the peripheral wall 42 under the lower edge of the window 51 in the forward and rearward direction. The base member 46 has an upper swelling portion 55 swelling in an upward direction from the upper portion of the peripheral wall 42. The upper swelling portion 55 extends in the forward and rearward direction and has the above mentioned upper groove 86 (see FIGS. 5 and 9) on its inner surface side. The base member 46 has a plate-shaped clamp member mounting portion 56 protruding in an upward direction from the upper portion of the outer surface of the upper swelling portion 55. The clamp member mounting portion 56 has a clamp split 56a penetrating the clamp member mounting portion 56 in a rightward and leftward direction. A pair of front and rear engaged ribs 57 and 58 are respectively provided at the front end portion and the rear end portion of the clamp member mounting portion 56, respectively. Each of the engaged ribs 57 and 58 has a substantially right triangle shape as viewed from the forward direction. The engaged ribs 57 and 58 extend in a leftward direction from the clamp member mounting portion 56 and in an upward direction from the left end portion of the upper swelling portion 55. A slope 55a is defined by the outer surface of the upper swelling portion 55 between the engaged ribs 57 and 58. The slope 55a is tilted downward in a leftward direction.

The lid member 47 is made of a resin material such as polypropylene containing glass fiber. The lid member 47 has a plate-shaped base portion 61 which is sized to close the window 51. A pair of front and rear engagement hook portions 62 and 63 are provided at the lower edge portion of the base portion 61 such that the engagement hook portions 62 and 63 are disengageably engaged with engagement holes 53 and 54 of the base member 46. The lower end portions of the engagement hook portions 62 and 63 protrude toward an inside surface of the lid member 47. The base portion 61 is provided with a tongue portion 64 extending in an upward direction from the upper edge portion thereof. The tongue portion 64 has a clamp member engagement protrusion 64a at the upper edge portion of the outer surface thereof. The outer surface of the tongue portion 64 is smoothly continuous with the outer surface of the base portion 61. A pair of front and rear ribs 65 are provided on the outer surface of the tongue portion 64 to reach a portion of the base portion 61. The front and rear ribs 65 provide stiffness of the tongue portion 64. A through-hole 66 for discharging mud and debris opens at a base region of the tongue portion 64, in a location between the ribs 65.

Figure 8A:
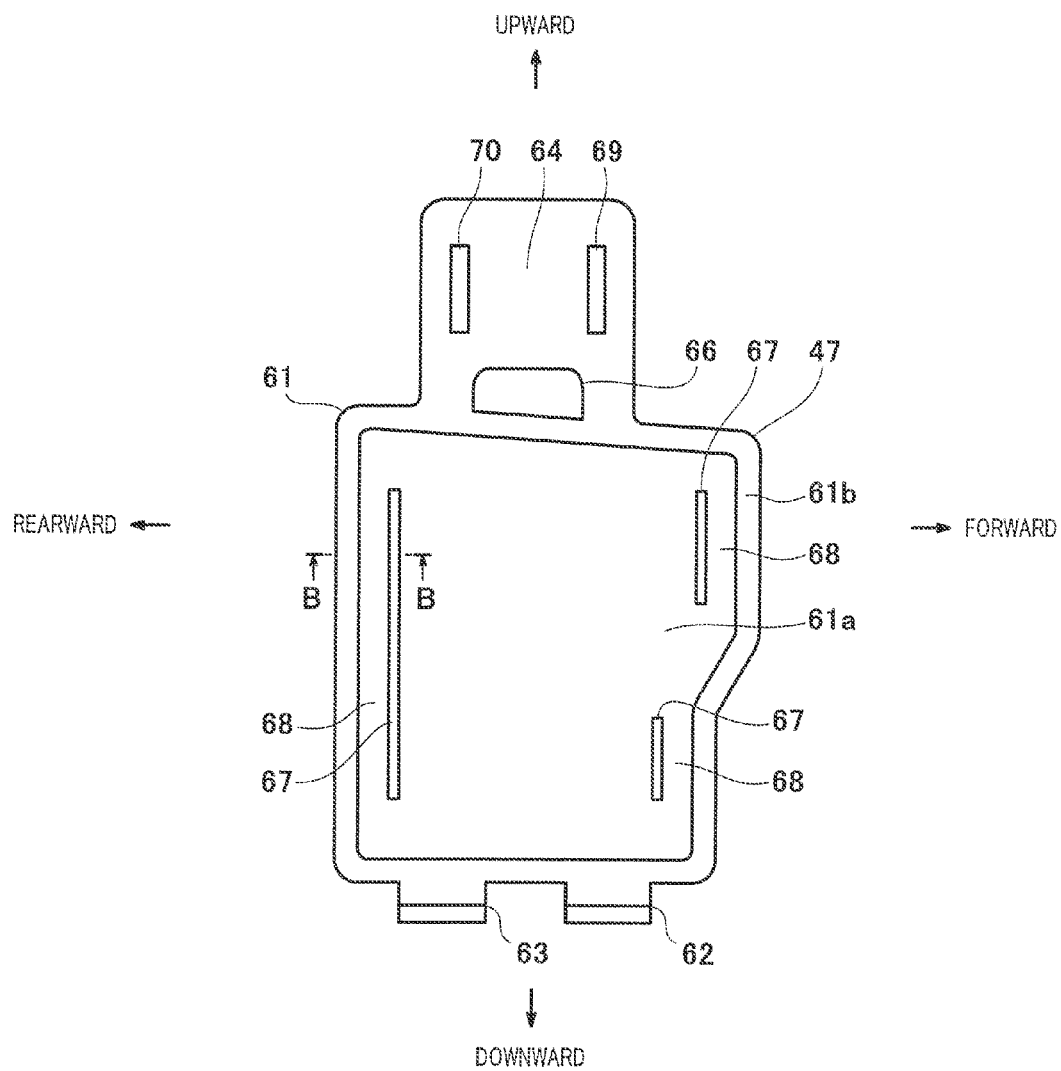
FIG. 8A is a view showing an inner portion of the lid member of FIG. 4.
Figure 8B:
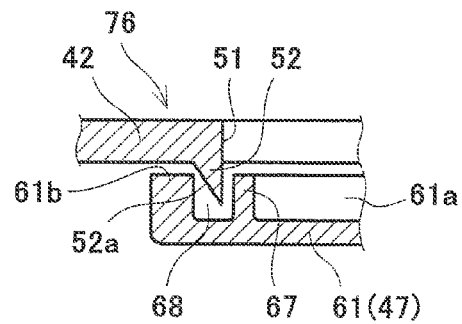
FIG. 8B is a partial cross-sectional view of the lid member taken along line B-B of FIG. 8A.

FIG. 8A is a view showing the inner surface portion of the lid member 47 of FIG. 4, and FIG. 8B is a partial cross-sectional view of the lid member 47 taken along line B-B of FIG. 8A. FIG. 8B also shows the base member 46 with the window 51 closed by the lid member 47. As shown in FIGS. 8A and 8B, the base portion 61 of the lid member 47 has a frame-shaped outer edge portion 61b extending along its outer shape, on the inner surface side. A recess 61a is formed inward relative to the outer edge portion 61b. A plurality of insertion ribs 67 protrude from the inner surface of the lid member 47 within the recess 61a. The insertion ribs 67 are arranged in parallel with a vertically extending portion of the outer edge portion 61b such that the insertion ribs 67 are spaced apart from the vertically extending portion. Between the vertically extending portion of the outer edge portion 61b and each insertion rib 67, a restricting groove 68 is formed to extend vertically. The tongue portion 64 is provided with engagement ribs 69 and 70 arranged in the forward and rearward direction, on the inner surface thereof. The engagement ribs 69 and 70 extend substantially vertically in parallel.

The clamp member 48 of FIG. 4 is made of a thinned spring steel. The clamp member 48 has a curved portion 71 which is curved in a substantially-C shape. The clamp member 48 has a base member insertion portion 72 and a lid member insertion portion 73 at one end portion and an opposite end portion of the curved portion 71, respectively, to protrude to face each other. A finger grip portion 74 is provided at an opposite end portion of the curved portion 71 in a location slightly above the lid member insertion portion 73 such that the finger grip portion 74 protrudes in an opposite direction to protruding of the lid member insertion portion 73.

As described above, the clamp member 48 is substantially composed of four parts. Alternatively, to implement a structure in which the base member insertion portion 72 and the lid member insertion portion 73 face each other and the lid member insertion portion 73 and the finger grip portion 74 protrude in opposite directions, the clamp member 48 may be composed of two or more spring steel components. In this embodiment, the clamp member 48 is composed of two components which are a component 48a constituted by the substantially entire curved portion 71 and the base member insertion portion 72, and a component 48b constituted by the opposite end portion of the curved portion 71, the lid member insertion portion 73 and the finger grip portion 74. By constituting the finger grip portion 74 and the lid member insertion portion 73 by the identical component 48b, the operation of the finger grip portion 74 is easily reflected in the operation of the lid member insertion portion 73, and the lid member 47 is easily opened and closed as described later.

Figure 9:
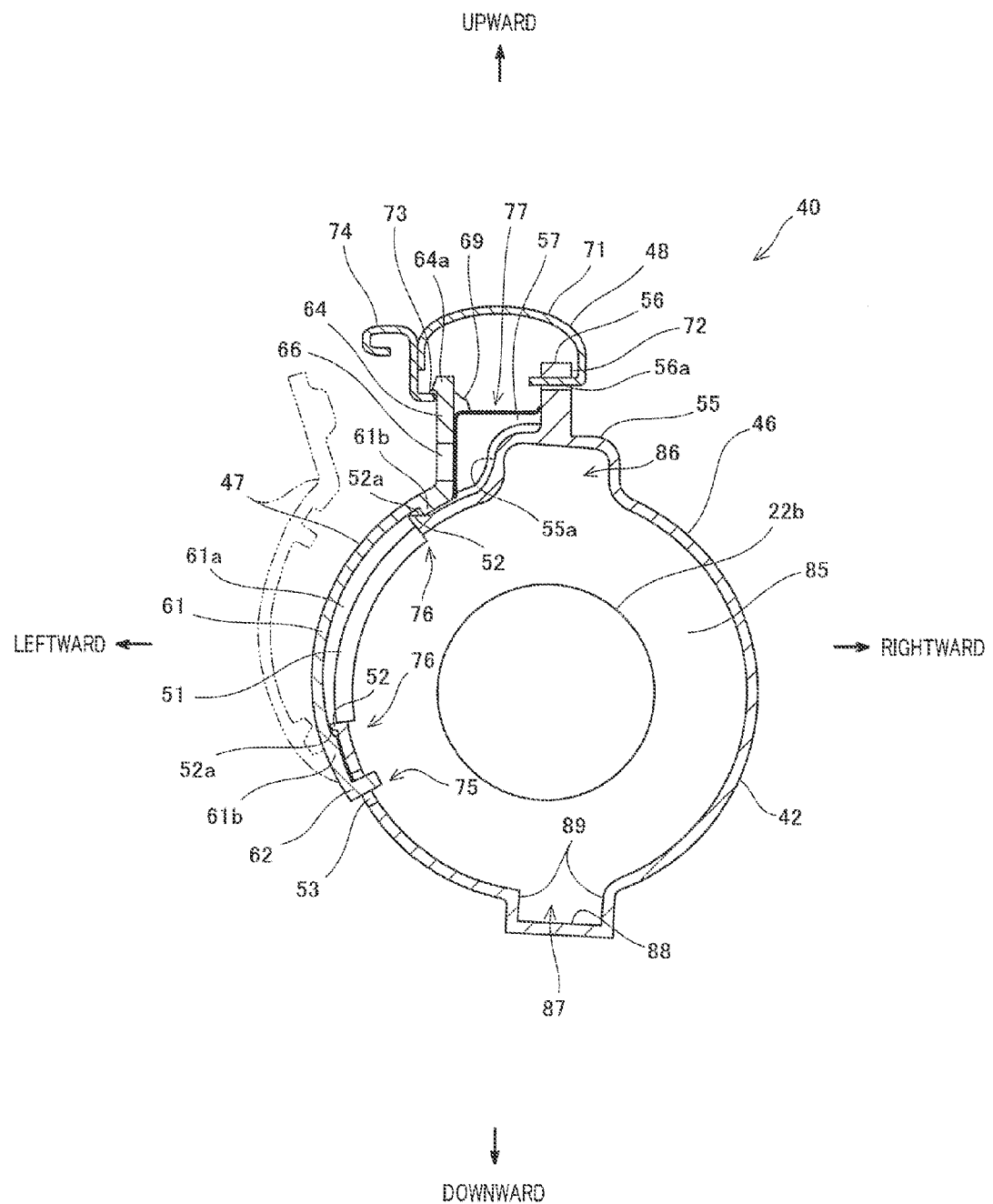
FIG. 9 is a cross-sectional view of the shield member taken along line IX-IX of FIG. 7.

FIG. 9 is a cross-sectional view of the shield member 40 taken along line IX-IX of FIG. 7. As shown in FIGS. 7 and 9, the lid member 47 is attached to the base member 46 in such a manner that the base portion 61 closes the window 51. To attach the lid member 47 to the base member 46, initially, the pair of front and rear engagement hook portions 62 and 63 are brought into engagement with the corresponding engagement holes 53 and 54 of the base member 46, respectively. The base member 46 and the lid member 47 have a hook-engagement structure 75 including the engagement holes 53 and 54 and the engagement hook portions 62 and 63, for allowing the lid member 47 to be disengageably engaged with the base member 46. With the engagement hook portions 62 and 63 engaged with the engagement holes 53 and 54, respectively, the lid member 47 is pivotable around the engagement hook portions 62 and 63 with respect to the base member 46 (see solid line and two-dotted line in FIG. 9). The pivot axis of the lid member 47 is oriented substantially in the forward and rearward direction.

After engaging the lid member 47 with the base member 46 with the hook-engagement structure 75, the lid member 47 is pivoted such that the upper end portion of the tongue portion 64 is close to the outer surface of the peripheral wall 42. By this operation, the window 51 is covered with the base portion 61 and the engaged ribs 57 and 58 are engaged with the engagement ribs 69 and 70, respectively.

As shown in FIG. 9, with the window 51 covered with the base portion 61, the restricting ribs 52 are accommodated into the recess 61a and disposed along the outer edge portion 61b. Although only the upper and lower restricting ribs 52 are shown in FIG. 9, the front and rear restricting ribs 52 are accommodated in the same manner. The base member 46 and the lid member 47 have a restricting structure 76 composed of the restricting ribs 52, the recess 61a and the outer edge portion 61b. The restricting structure 76 restricts displacement of the base portion 61 of the lid member 47 relative to the base member 46 in a direction along the outer surface of the peripheral wall 42.

As shown in FIG. 8B, the vertically extending portions of the front and rear restricting ribs 52 are accommodated into the restricting grooves 68 formed between the vertically extending portion of the outer edge portion 61b and the insertion ribs 67. Since the restricting structure 76 includes the insertion ribs 67 and the restricting grooves 68, the base portion 61 of the lid member 47 is effectively prevented from being displaced in the forward and rearward direction relative to the base member 46. The insertion ribs 67 are inserted into the inside of the window 51 and disposed along the periphery of the window 51. When the lid member 47 is pivoted to allow the base portion 61 to cover the window 51, the lid member 47 can be positioned merely by inserting the insertion ribs 67 into the inside of the window 51. With the lid member 47 attached to the base member 46, the insertion ribs 67 and the periphery of the window 51 allow the lid member 47 to be fastened to the base member 46 stably without any displacement in the forward and rearward direction.

While the lid member 47 is pivoted around the pivot axis oriented substantially in the forward and the rearward direction, the insertion ribs 67 and the periphery of the window 51 are arranged in the forward and rearward direction. Because of this, the insertion ribs 67 provided at the lid member 47 can be easily inserted into the inside of the window 51 without interfering with the periphery of the window 51 and the restricting ribs 52. Since the restricting ribs 52 and the restricting grooves 68 are arranged in the forward and rearward directions, interference between them can be prevented in the same manner during a pivot movement of the lid member 47. Although the upper and lower restricting ribs 52 are arranged in the vertical direction with respect to the outer edge portion 61b, the restricting ribs 52 have tapered surfaces 52a opposite to the outer edge portion 61b (see FIGS. 8B and 9). For this reason, the restricting ribs 52 are accommodated into the recess 61a and disposed along the outer edge portion 61b without interfering with the outer edge portion 61b.

As shown in FIG. 6, the tongue portion 64 is disposed to extend vertically upward at the left side of the upper swelling portion 55, and the inner surface of the tongue portion 64 is adjacent to the left end portions of the engaged ribs 57 and 58 of the base member 46. The opposite surfaces of the pair of front and rear engagement ribs 69 and 70 provided at the tongue portion 64 are disposed along the outer surfaces of the engaged ribs 57 and 58. To be specific, the opposite surface (rear surface) of the front engagement rib 69 is disposed along the outer surface (front surface) of the front engaged rib 57, while the opposite surface (front surface) of the rear engagement rib 70 is disposed along the outer surface (rear surface) of the rear engaged rib 58. Thus, the pair of engagement ribs 69 and 70 are accommodated into the space formed between the pair of engaged ribs 57 and 58 such that the engagement ribs 69 and 70 are in close proximity to the engaged ribs 57 and 58, respectively. Thus, the base member 46 and the lid member 47 have an engagement structure 77 including the pair of engaged ribs 57 and 58 and the pair of engagement ribs 69 and 70, for allowing the lid member 47 to be disengageably engaged with the base member 46. The engaged rib 57 and the engagement rib 69 are arranged in the forward and rearward direction, and the engaged rib 58 and the engagement rib 70 are arranged in the forward and rearward direction. For this reason, like the restricting structure 76, by merely pivoting the lid member 47 around the hook-engagement structure 75, the pair of engaged ribs 57 and 58 are easily disposed along the engagement ribs 69 and 70, respectively, without interfering with the engagement ribs 69 and 70.

As shown in FIG. 9, with the base member 46 and the lid member 47 engaged with each other by the engagement structure 77, the clamp member mounting portion 56 is opposite to the upper end portion of the tongue portion 64 in a rightward and leftward direction. The base member insertion portion 72 is inserted into the clamp slit 56a of the clamp member mounting portion 56 from the right side, thereby allowing the clamp member 48 to be disengageably mounted to the base member 46. The curved portion 71 is disposed in an arch-shape above the clamp member mounting portion 56 and the tongue portion 64. The lid member insertion portion 73 is engaged with the lower surface of the clamp member engagement protrusion 64a from the left side. In this case, the curved portion 71 is elastically deformed to push the lid member insertion portion 73 to the left with the base member insertion portion 72 supported on the base member 46. Because of this, with the lid member insertion portion 73 engaged with the clamp member engagement protrusion 64a, the curved portion 71 produces an elastic force to return the lid member insertion portion 73 to the right. By the elastic force, the clamp member mounting portion 56 and the tongue portion 64 are pressed closer to each other. As a result, the base member 46 and the lid member 47 are retained to be engaged with each other by the engagement structure 77.

As described above, by using the hook-engagement structure 75 (see FIGS. 7 and 9), the insertion ribs 67 (see FIG. 8B), the restricting structure 76 (see FIGS. 8B and 9), the engagement structure 77 (see FIGS. 6, 7 and 9), and the clamp member 48 (see FIGS. 4, 7, and 9), the lid member 47 is firmly fastened to the base member 46. This effectively prevents vibration and disengagement of the lid member 47 during driving of the all terrain vehicle 1. The all terrain vehicle 1 often drives off-road. The vibration generated during driving off-road is likely to be transmitted to the vehicle body. Therefore, the above described firm mounting structure is very useful in application of the lid member 47 to the shield member 40 of the all terrain vehicle 1. Since the restricting ribs 52 surrounding the window 51 are accommodated into the recess 61a, debris such as muddy water, is effectively prevented from moving into the space 45 of the base member 46 through the window 51, with the lid member 47 covering the window 51.

In some cases, debris such as muddy water moves into the space between the pair of engaged ribs 57 and clamp member 48 from above. As shown in FIG. 9, this space is closed by the inner surface of the tongue portion 64, but communicates with the outside through the through-hole 66 formed at the base region of the tongue portion 64. Because of this, debris can be discharged from this space through the through-hole 66 immediately. The bottom surface of the space is defined by the slope 55a. Debris moves by its own weight along slope 55a toward the through-hole 66. In this way, debris can be easily discharged from the space between the engaged ribs 57 and clamp member 48, through the through-hole 66.

When the operator opens the window 51 to carry out a maintenance operation through the opened window 51, the operator accesses the clamp member 48 from the left side of the vehicle body, disengages the clamp member 48 from the base member 46 and pivots the lid member 47 to open the window 51. As described above with reference to FIG. 3, the electric motor 22b is positioned to deviate to the left from a center line extending in the longitudinal direction of the all terrain vehicle 1 as viewed from above. Since the window 51 is provided at the left portion of the peripheral wall 42, the operator can access the lid member 47 covering the window 51 with a shorter distance, facilitating the maintenance operation.

Now, the operation for opening the window 51 will be described in detail with reference to FIG. 9. Firstly, the operator grabs the finger grip portion 74 of the clamp member 48, protruding to the left, and pulls the clamp member 48 closer to the operator, i.e., to the left, thereby disengaging the lid member insertion portion 73 from the clamp member engagement protrusion 64a. Since the finger grip portion 74 and the lid member insertion portion 73 are formed by an identical component as described above, the operator can easily disengage the lid member insertion portion 73 from the clamp member engagement protrusion 64*a*.

Then, the operator grabs the upper edge portion of the tongue portion 64 to pivot the lid member 47 closer to the operator (to the left in FIG. 9). In this case, the lid member 47 is pivoted around the hook-engagement structure 75 provided under the window 51 and the base portion 61, the window 51 is opened from its upper portion. As described above with reference to FIG. 2, since the support board 25 to which the shield member 40 is mounted is positioned above the transaxle device 17 and below the power steering device 22, the operator can easily access the opened upper portion (see FIG. 9) of window 51. For example, the operator may insert a hose into the opened upper portion of the window 51 to easily release water into the clearance 85. The water released into the clearance 85 is collected into the lower groove 87 and drops in a downward direction along with the debris, in front of the support board 25 (see FIG. 6). In this way, the clearance 85 can be easily washed by the water in a structure in which the substantially-cup shaped shield member 40 covers the electric motor 22*b*. By disengaging the engagement hook portions 62 and 63 of the lid member 47 from the engagement holes 53 and 54, the lid member 47 can be completely dismounted from the base member 46. Thus, the window 51 is further opened, facilitating the maintenance operation.

Although the engagement holes 53 and 54 of the hook-engagement structure 75 are through-holes in this embodiment, they may alternatively be non-through-holes which are opened only in the outer surface of the peripheral wall 42 and are not opened in the inner surface thereof. The hook-engagement structure 75 may include an engagement hole provided in the lid member 47 and an engagement portion protruding from the outer surface of the peripheral wall 42 and being engageable with the engagement hole. The restricting structure 76 may include restricting grooves provided on the outer surface of the peripheral wall 42 in a location of the outer peripheral edge portion of the window 51 and restricting ribs which are provided on the inner surface of the base portion 61 of the lid member 47 and fitted to the restricting grooves. The engagement structure 77 may be such that the engaged ribs of the base member 46 may be disposed outside the engagement ribs of the lid member 47. In other words, the opposite surfaces of the pair of engaged ribs may be disposed along the outer side surfaces of the pair of engagement ribs of the lid member 47.

Although in this embodiment, the window 51 is disposed at the left portion of the peripheral wall 42, the window 51 may be provided in other suitable ways so long as it partially opens the peripheral wall 42. For example, the windows 51 may be disposed at right and left portions of the peripheral wall 42. If the electric motor 22*b* is positioned to deviate to the right from the center line extending in the longitudinal direction of the vehicle 1, the window 51 may be disposed to open the right portion of the peripheral wall 42.

Figure 10:
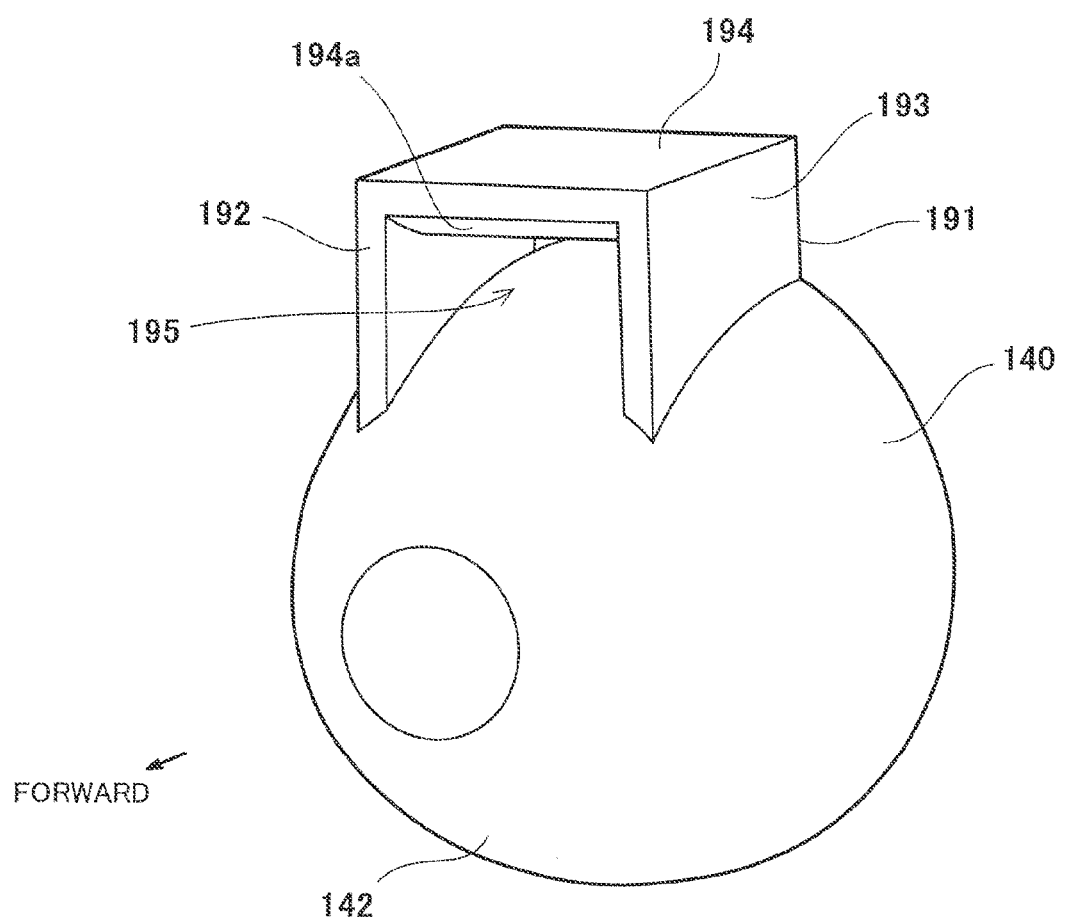
FIG. 10 is a perspective view of a shield member according to Embodiment 2 of the present invention.
Figure 11:
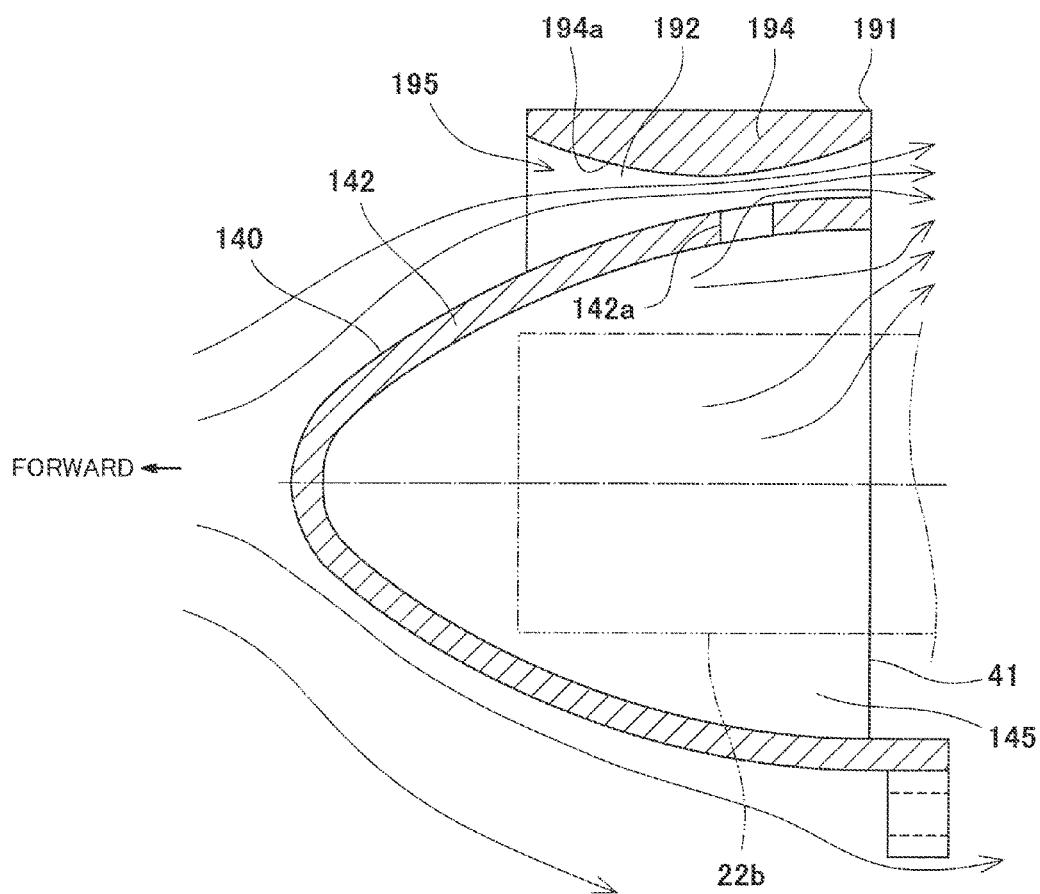
FIG. 11 is a cross-sectional view of the shield member of FIG. 10, as viewed from the side.

FIG. 10 is a perspective view of a shield member 140 according to Embodiment 2 of the present invention. FIG. 11 is a cross-sectional view of the shield member 140 of FIG. 10, as viewed from the side. In Embodiment 2, the same or corresponding constituents in Embodiment 1 are designated by the same reference numerals and will not be described repetitively.

As shown in FIGS. 10 and 11, the shield member 140 has a substantially cup shape like the shield member 40 of Embodiment 1. The electric motor 22*b* is accommodated into a space 145 defined by a peripheral wall 142 of the shield member 140. To be specific, the peripheral wall 142 has an outer surface of a bullet head shape. The peripheral wall 142 has a taper shape decreasing in dimension in a forward direction. There is not substantially a wall portion corresponding to the bottom wall 43 (see FIG. 3) of Embodiment 1. The front side of the electric motor 22*b* is substantially covered by the tapered peripheral wall 142.

The shield member 140 has a passage forming portion 191 provided at the outer surface of the peripheral wall 142. The passage forming portion 191 includes a pair of side walls 192 and 193 vertically extending from the outer surface of the peripheral wall 142 at right and left sides, respectively, and an upper wall 194 extending in a rightward and leftward direction and coupling the upper portions of the side walls 192 and 193 to each other. Because of the passage forming portion 191, a restricting passage 195 defined by the inner surfaces of the side walls 192 and 193, an inner surface 194*a* of the upper wall 194 and the outer surface of the peripheral wall 142 is formed. The restricting passage 195 extends in the forward and rearward direction. One end of the restricting passage 195 opens in a forward direction and the opposite end thereof opens in a rearward direction. As described later, heated air released from the radiator fan 34*a* (see FIG. 2) disposed in front of the shield member 140 is released into the restricting passage 195. An inlet opening at the front is an upstream end of the restricting passage 195 in an air flow direction and an outlet opening at the rear is a downstream end of the restricting passage 105. The downstream end of the restricting passage 195 conforms in location in the forward and rearward direction to the opening 41 (see FIG. 11) of the space 145 formed inside of the peripheral wall 142.

As shown in FIG. 11, the inner surface 194*a* of the upper wall 194, among the surfaces forming the restricting passage 195, is opposite to the outer surface of the peripheral wall 142 in a radial direction of the peripheral wall 142. The inner surface 194*a* of the upper wall 194 has a wing-shaped cross-section as viewed from the side. To be more specific, a distance between the inner surface 194*a* of the upper wall 194 and the outer surface of the peripheral wall 142 is relatively large at a front end portion of the upper wall 194 which is an upstream end portion and at a rear end portion of the upper wall 194 which is a downstream end portion, while the inner surface 194*a* protrudes toward the outer surface of the peripheral wall 142 in the vicinity of its center portion in the forward and rearward direction to gradually decrease a distance between the inner surface 194*a* and outer surface of the peripheral wall 142. A spacing between the opposite surfaces of the pair of side walls 192 and 193 is constant in the forward and rearward direction, and therefore the restricting passage 195 has a smaller passage cross-section at its midstream portion.

In the all terrain vehicle 1 including the shield member 140 configured as described above, the heated air from the radiator fan 34*a* collides against the front end portion of the peripheral wall 142 and then flows in a rearward direction along the outer surface of the peripheral wall 142. A part of the heated air flowing through the upper portion of the outer surface of the peripheral wall 142 is guided into the restricting passage 195. Since the restricting passage 195 has a portion of a smaller passage cross-section, the speed of the heated air which has flowed through the restricting passage 195 and is flowing in a rearward direction from the downstream end of the restricting passage 195, is higher than the speed of surrounding air. In addition, since the inner surface of the upper wall 194 forming the restricting passage 195 has a wing shape and the outer surface of the peripheral wall 142 forming the restricting passage 195 has a bullet head shape, a high speed is maintained while the air is flowing through the restricting passage 195.

The above structure results in a large pressure difference between the inside of the space 145 in which the electric motor 22b is accommodated and a region behind the downstream end of the restricting passage 195. Due to this pressure difference, the heated air inside the space 145 is forced to move toward the air in a region downstream of the downstream end of the restricting passage 195. This allows the heated air released from the electric motor 22b into the space 145 to be guided to the outside. As a result, the shield member 140 has a high heat radiation capability.

Alternatively, as shown in FIG. 11, the peripheral wall 142 may be provided with a through-hole 142a for providing communication between the space 145 and the restricting passage 195. Because of the through-hole 142a, the heated air inside the space 145 is forced to flow toward the air within the restricting passage 195, thereby radiating heat more effectively. In a further alternative, a plurality of through-holes 142a may be provided such that they are spaced apart from each other in a circumferential direction of the peripheral wall 142.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An all terrain vehicle comprising:
 a vehicle body frame;
 a steering shaft rotatably supported by the vehicle body frame;
 a power steering device including an electric motor, the power steering device being configured to exert an auxiliary rotational force to the steering shaft by a driving power generated in the electric motor;
 a radiator disposed in front of the electric motor; and
 a shield member mounted to the vehicle body frame and positioned between the radiator and the electric motor to cover the electric motor from a forward direction,
 wherein the shield member is substantially cup shaped and includes a peripheral wall and a bottom wall forming a space opened by an opening; and
 wherein in a state where a front portion of the electric motor is accommodated into the space of the shield member, the front portion of the electric motor is surrounded by the peripheral wall, the bottom wall covers the electric motor from the forward direction, and the opening of the substantially cup shaped shield member is oriented in a rearward direction of the all terrain vehicle.

2. The all terrain vehicle according to claim 1,
 wherein the substantially cup shaped shield member has a flange protruding outward from an outer surface of the peripheral wall.

3. The all terrain vehicle according to claim 1,
 wherein the substantially cup shaped shield member has a shape in which a clearance between an inner surface of the peripheral wall and an outer surface of the electric motor increases in dimension in a direction toward the opening.

4. The all terrain vehicle according to claim 3, wherein the inner surface of the peripheral wall has a lower portion tilted in a downward direction in the direction toward the opening.

5. The all terrain vehicle according to claim 1,
 wherein the substantially cup shaped shield member has a lower groove which is formed by protruding a lower portion of an inner surface of the peripheral wall in a downward direction and is connected to the space; and
 the lower groove opens at a rear end portion of the substantially cup shaped shield member.

6. The all terrain vehicle according to claim 5,
 wherein the lower groove includes a bottom groove portion extending in a forward and rearward direction below the inner surface of the peripheral wall and a pair of side groove portions connecting the bottom groove portion to the inner surface of the peripheral wall;
 and wherein the bottom groove portion of the lower groove is cut in a forward direction at a rear end portion of the peripheral wall where the opening is open, to open the lower groove in a downward direction.

7. The all terrain vehicle according to claim 1,
 wherein the substantially cup shaped shield member has an upper groove which is formed by protruding an upper portion of an inner surface of the peripheral wall in an upward direction and is connected to the space.

8. The all terrain vehicle according to claim 1,
 wherein the substantially cup shaped shield member includes a window configured to open the peripheral wall and a lid member configured to open and close the window.

9. The all terrain vehicle according to claim 8,
 wherein the electric motor is positioned to deviate in a leftward direction or a rightward direction, from a center line of a vehicle body in a rightward and leftward direction, and the window is disposed on a left portion or a right portion of the peripheral wall.

10. The all terrain vehicle according to claim 8,
 wherein the lid member is configured to cover the window and includes insertion ribs disposed along a periphery of the window.

11. The all terrain vehicle according to claim 8,
 wherein the peripheral wall and the lid member have a restricting structure for restricting relative displacement of the peripheral wall and the lid member in a direction along an outer surface of the peripheral wall.

12. The all terrain vehicle according to claim 8,
 wherein the lid member has a base portion sized to close the window;
 wherein the peripheral wall and the lid member have an engagement structure for disengageably engaging the lid member with the peripheral wall;
 and wherein in a state where the peripheral wall and the lid member are engaged with each other, the lid member is pivotable around the engagement structure with respect to the peripheral wall.

13. The all terrain vehicle according to claim 12,
 wherein the peripheral wall and the lid member have a second engagement structure for disengageably engaging the lid member with the peripheral wall;
 the all terrain vehicle further comprising:
 a clamp member configured to clamp the peripheral wall and the lid member such that the lid member is disengageably engaged with the peripheral wall by the engagement structure.

14. The all terrain vehicle according to claim 13,
 wherein the peripheral wall and the lid member are engaged with each other by the engagement structure below the window and the base portion;
 wherein the engagement structure includes a pair of engaged ribs arranged in a forward and rearward direction to protrude from an outer surface of the peripheral wall, a tongue portion extending upward from an upper edge portion of the base portion of the lid member; and a pair of engagement ribs arranged in the forward and rearward direction to protrude inward from an inner surface of the tongue portion;

and wherein opposing inner surfaces of the pair of engaged portions are disposed along outer side surfaces of the pair of engagement ribs so that opposing inner surfaces of the pair of engagement ribs define a space between the ribs, or wherein opposing inner surfaces of the pair of engagement ribs are disposed along outer side surfaces of the pair of engaged portions so that opposing inner surfaces of the pair of engaged portions define a space between the ribs.

15. The all terrain vehicle according to claim 14, wherein the tongue portion has a hole configured to discharge debris therethrough, the hole being configured to communicate the space between the ribs with an outside space which is on an opposite side of inside of the tongue portion, in a state where the peripheral wall and the lid member are engaged with each other by the engagement structure.

16. The all terrain vehicle according to claim 1, wherein the shield member includes a passage forming portion provided on an outer surface of the peripheral wall to form a restricting passage extending in a forward and rearward direction along an outer surface side of the peripheral wall, an upstream end of the restricting passage is opened in a forward direction and a downstream end of the restricting passage is opened in a rearward direction.

17. The all terrain vehicle according to claim 16, wherein the outer surface of the peripheral wall has a bullet head shape.

18. The all terrain vehicle according to claim 16, wherein the passage forming portion has an inner surface forming the restricting passage together with the outer surface of the peripheral wall, and the inner surface is opposite to the outer surface of the peripheral wall in a radial direction of the peripheral wall and has a wing-shaped cross-section.

19. An all terrain vehicle comprising:

a vehicle body frame;

a steering shaft rotatably supported by the vehicle body frame;

a power steering device including an electric motor, the power steering device being configured to exert an auxiliary rotational force to the steering shaft by a driving power generated in the electric motor;

a radiator disposed in front of the electric motor; and a shield member mounted to the vehicle body frame and positioned between the radiator and the electric motor to cover the electric motor from a forward direction;

a support board fastened to the vehicle body frame, the power steering device being mounted to the support board;

wherein the shield member is mounted to the support board and supported by the vehicle body frame via the support board.

* * * * *